US012676404B2

(12) United States Patent
Nemer et al.

(10) Patent No.: US 12,676,404 B2
(45) Date of Patent: Jul. 7, 2026

(54) ELECTRONIC MODULE ATTACHMENT SYSTEM FOR VEHICLE EXTERIOR TRIM COMPONENT

(71) Applicant: Ford Global Technologies, LLC, Dearborn, MI (US)

(72) Inventors: Nemer Nemer, Dearborn, MI (US); Aimée Kilbourn, Gaylord, MI (US); Edward M. Wilson, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 121 days.

(21) Appl. No.: 18/675,639

(22) Filed: May 28, 2024

(65) Prior Publication Data

US 2025/0372864 A1 Dec. 4, 2025

(51) Int. Cl.
| | |
|---|---|
| *H01Q 1/32* | (2006.01) |
| *B60R 11/02* | (2006.01) |
| *B60R 13/04* | (2006.01) |
| *B60R 11/00* | (2006.01) |

(52) U.S. Cl.
CPC ........... H01Q 1/3275 (2013.01); B60R 11/02 (2013.01); B60R 13/04 (2013.01); B60R 2011/004 (2013.01)

(58) Field of Classification Search
CPC ........... H01Q 1/32; B60R 11/02; B60R 13/04; B60R 11/00
See application file for complete search history.

(56) References Cited

U.S. PATENT DOCUMENTS

| | | | |
|---|---|---|---|
| 10,755,613 B2 | 8/2020 | Brubaker | |
| 2004/0103596 A1 | 6/2004 | Don et al. | |
| 2007/0220811 A1 | 9/2007 | Flendrig et al. | |
| 2011/0279329 A1* | 11/2011 | Kleinert | H01Q 1/1214 343/702 |
| 2012/0274519 A1* | 11/2012 | Chakam | H01Q 1/3275 343/702 |
| 2013/0333941 A1 | 12/2013 | Snider | |
| 2013/0342405 A1* | 12/2013 | Ueno | H01Q 1/3275 343/713 |

(Continued)

FOREIGN PATENT DOCUMENTS

| | | |
|---|---|---|
| CN | 211700554 U | 10/2020 |
| CN | 212968021 U | 4/2021 |

(Continued)

*Primary Examiner* — Thien M Le
(74) *Attorney, Agent, or Firm* — Vichit Chea; Price Heneveld LLP

(57) ABSTRACT

An electronic module attachment system for an exterior trim component on a vehicle having an upper container housing configured to couple to an upper surface of the exterior trim component to define an upper compartment. At least one electronic module is located in the upper compartment and an upper first seal for sealing the upper compartment relative to the upper surface of the exterior trim component. A lower container housing is configured to couple to a lower surface of the exterior trim component to define a lower compartment. Electrical circuitry is located in the lower compartment and a lower seal for sealing the lower container housing to the lower surface of the exterior trim component to seal the lower compartment.

20 Claims, 4 Drawing Sheets

(56)           References Cited

U.S. PATENT DOCUMENTS

| | | | | |
|---|---|---|---|---|
| 2014/0292593 A1* | 10/2014 | Thiam | H01Q 9/32 | |
| | | | | 343/893 |
| 2015/0123854 A1* | 5/2015 | Chakam | H01Q 1/1214 | |
| | | | | 343/702 |
| 2015/0188226 A1* | 7/2015 | Ng | H01Q 9/42 | |
| | | | | 343/862 |
| 2015/0270603 A1* | 9/2015 | Lee | H04B 1/18 | |
| | | | | 343/713 |
| 2015/0307026 A1* | 10/2015 | Minikey, Jr. | B60R 11/04 | |
| | | | | 348/148 |
| 2016/0070001 A1* | 3/2016 | Krantz | H01Q 1/3275 | |
| | | | | 342/357.72 |
| 2016/0249748 A1* | 9/2016 | Winters | G08B 21/02 | |
| | | | | 340/4.34 |
| 2016/0335276 A1* | 11/2016 | Butler | G06F 16/9537 | |
| 2017/0227250 A1 | 8/2017 | Karamanos | | |

FOREIGN PATENT DOCUMENTS

| | | | |
|---|---|---|---|
| CN | 116902082 A | 10/2023 |
| DE | 10339159 B4 | 10/2007 |
| WO | 2023137214 A2 | 7/2023 |

* cited by examiner

ELECTRONIC MODULE ATTACHMENT SYSTEM FOR VEHICLE EXTERIOR TRIM COMPONENT

FIELD OF THE DISCLOSURE

The present disclosure generally relates to electronic module attachment systems for motor vehicles, and more particularly relates to a system with a sealed compartment for attachment onto an exterior trim component of the motor vehicle.

BACKGROUND OF THE DISCLOSURE

Motor vehicles are commonly equipped with various electronic modules such as antenna modules that allow for communication with a cellular network infrastructure and radio communication. For example, electronic modules such as antenna modules may be installed on the interior or on the exterior of the motor vehicle where the electronic antenna module may be susceptible to rain and other environmental conditions. It may be desirable to provide for an attachment system for an electronic module on the exterior of a motor vehicle that offers a sealed containment of electrical parts, particularly for electronic components that may be affected by adverse weather conditions.

SUMMARY OF THE DISCLOSURE

According to a first aspect of the present disclosure, an electronic module attachment system for an exterior trim component on a vehicle includes an upper container housing configured to couple to an upper surface of the exterior trim component to define an upper compartment. At least one electronic module is located in the upper compartment. An upper first seal for sealing the upper compartment is relative to the upper surface of the exterior trim component. A lower container housing is configured to couple to a lower surface of the exterior trim component to define a lower compartment. Electrical circuitry is located in the lower compartment. A lower seal is included for sealing the lower container housing to the lower surface of the exterior trim component to seal the lower compartment.

Embodiments of the first aspect of the present disclosure can include any one or a combination of the following features:

- a plurality of lower fasteners fastening the lower container housing to the lower surface of the exterior trim component;
- the plurality of lower fasteners comprise a plurality of screws or bolts;
- the lower container housing is adhered or welded to the lower surface of the exterior trim component;
- an upper fastener for fastening the upper container housing to the upper surface of the exterior trim component;
- the upper fastener extends through an opening in the exterior trim component;
- the upper fastener engages a collar configured to be disposed in the opening in the exterior trim component;
- the upper compartment is accessible via the lower compartment;
- the at least one electronic module comprises of at least one antenna;
- the electrical circuitry comprises an electrical cable; and
- the exterior trim component comprises a spoiler trim component.

According to a second aspect of the present disclosure, a vehicle includes an exterior trim component having an upper surface, a lower surface and an opening extending between the upper and lower surfaces and an electronic module attachment system. The electronic module attachment system includes an upper container housing coupled to the upper surface of the exterior trim component to define an upper compartment. At least one electronic module is located in the upper compartment and an upper seal for sealing the upper container housing relative to the upper surface of the exterior trim component. A sealable collar is disposed in the opening. An upper fastener operatively engages the collar to fasten the upper container housing to the upper surface of the exterior trim component. A lower container housing is coupled to the lower surface of the exterior trim component to define a lower compartment. Electrical circuitry is located in the lower compartment. A lower seal engages the lower container housing to the lower surface of the exterior trim component to seal the lower compartment.

Embodiments of the second aspect of the present disclosure can include any one or a combination of the following features:

- a plurality of lower fasteners fastening the lower container housing to the lower surface of the exterior trim component;
- the plurality of lower fasteners comprise a plurality of screws or bolts;
- the lower container housing is adhered or welded to the lower surface of the exterior trim component;
- the upper fastener extends through the collar in the opening in the exterior trim component;
- the upper compartment is accessible via the lower compartment;
- the at least one electronic module comprises of at least one antenna;
- the electrical circuitry comprises an electrical cable; and
- the exterior trim component comprises a spoiler trim component.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
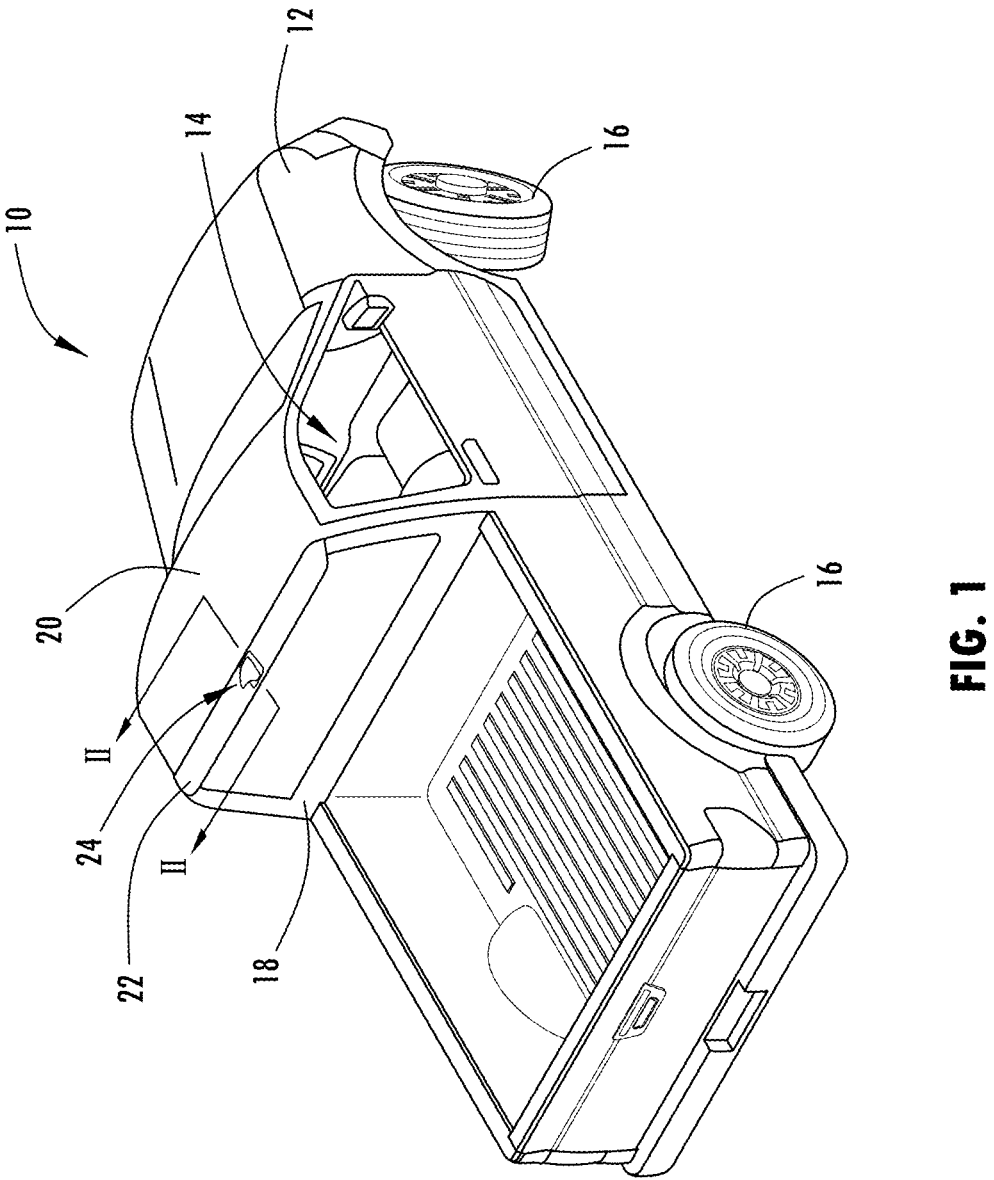
FIG. 1 is an upper perspective view of a motor vehicle having an electronic module attachment system installed on a spoiler trim component on the motor vehicle exterior proximate to the roof, according to one example.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to an electronic module attachment system for an exterior trim component on a motor vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, an automotive or motor vehicle 10 is generally illustrated in the form of a passenger vehicle configured as a pickup truck, according to one example. The motor vehicle 10 has a body 12 which generally defines a cabin interior 14. The body 12 typically has body panels, windows, a windshield, a roof, and access doors. In the example shown, the motor vehicle 10 has a generally horizontal roof 20 and a rear wall 18 of the cabin interior 14 that generally extends vertically downward from a rear edge of the roof 20. The motor vehicle 10 is also equipped with a plurality of wheel and tire assemblies 16. The cabin interior 14 generally defines a passenger compartment that typically includes a plurality of seat assemblies and electronic systems such as radio systems, telematic systems, navigation systems, communication systems such as phone and vehicle-to-vehicle communications, and other electronic systems that require communication electronics such as antennas and associated electrical circuitry. It should be appreciated that the motor vehicle 10 may be equipped with various accommodations and accessories and may otherwise be configured in other forms such as a sedan, an SUV, a van, a bus, and other configurations of motor vehicles.

The body 12 includes the generally horizontal roof 20 which generally defines the top side of the cabin interior 14 with a spoiler trim component 22 mounted on the roof 20 in the example shown. The spoiler trim component 22 extend from the roof 20 near a rear end and is shown arranged generally horizontal. According to this example, the motor vehicle 10 includes an electronic module attachment system 24 attached to the spoiler trim component 22 which is fixed proximate to a rear end of the roof 20. It should be appreciated that the motor vehicle 10 may have any number of exterior trim components capable of having the electronic module attachment system 24 connected thereto. In the example shown, the electronic module attachment system 24 includes an antenna module that may include one or more antennas for communicating with various communication electronics to transmit and receive signals. The electronic module attachment system 24 advantageously employs electronics and associated electrical circuitry that may be contained within a dry sealed compartment that is sealed from water as well as dirt, dust and other exterior environmental elements. It should be appreciated that the electronic components employed within the electronic module attachment system 24 may be configured to be packaged as dry components that are sealed within a water sealed compartment and thus the electronic module attachment system 24 may advantageously be used in a wet environment.

Figure 2:
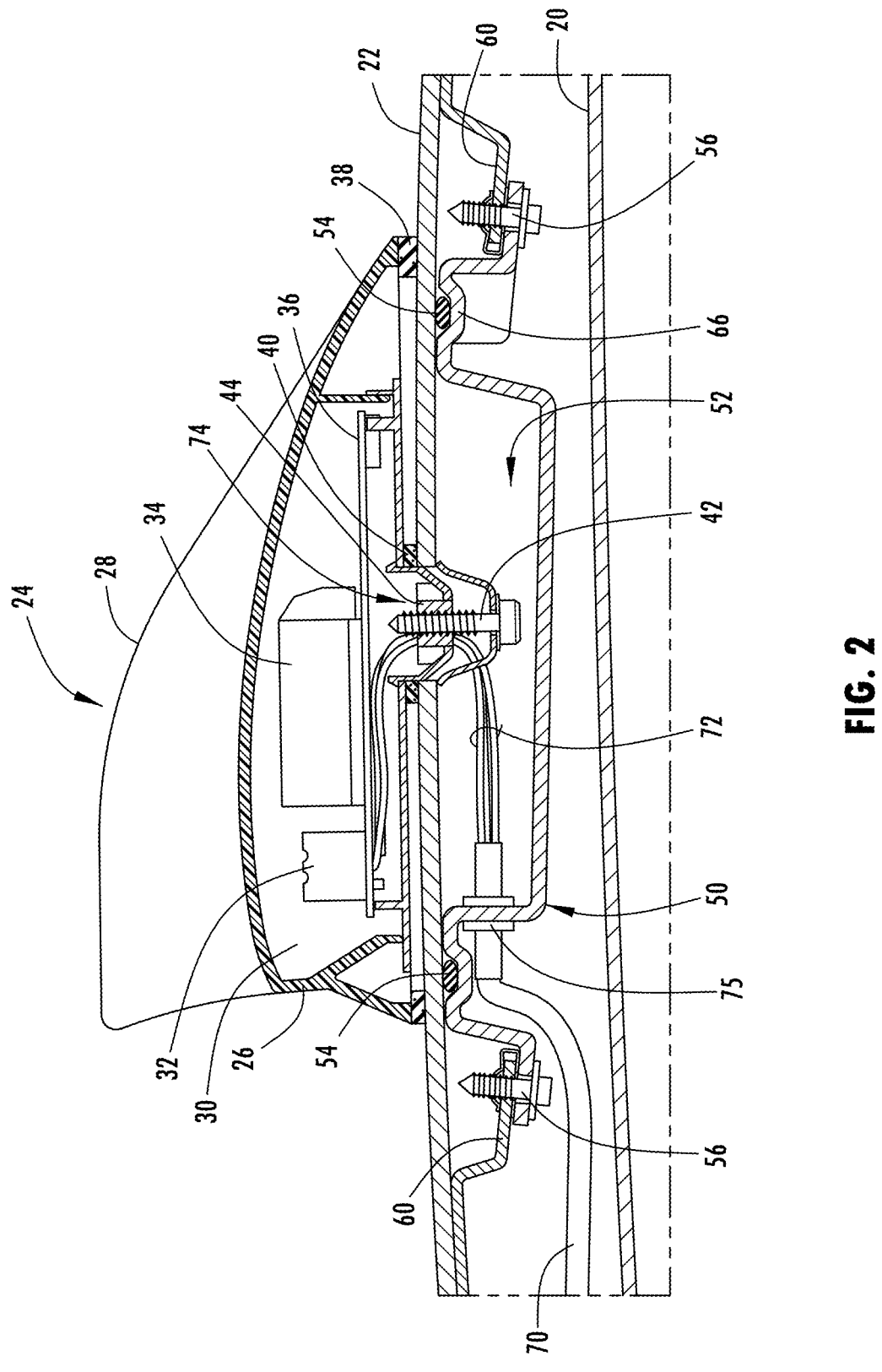
FIG. 2 is a cross-sectional view taken through line II-II of FIG. 1 further illustrating the electronic module attachment system, according to a first embodiment.
Figure 3:
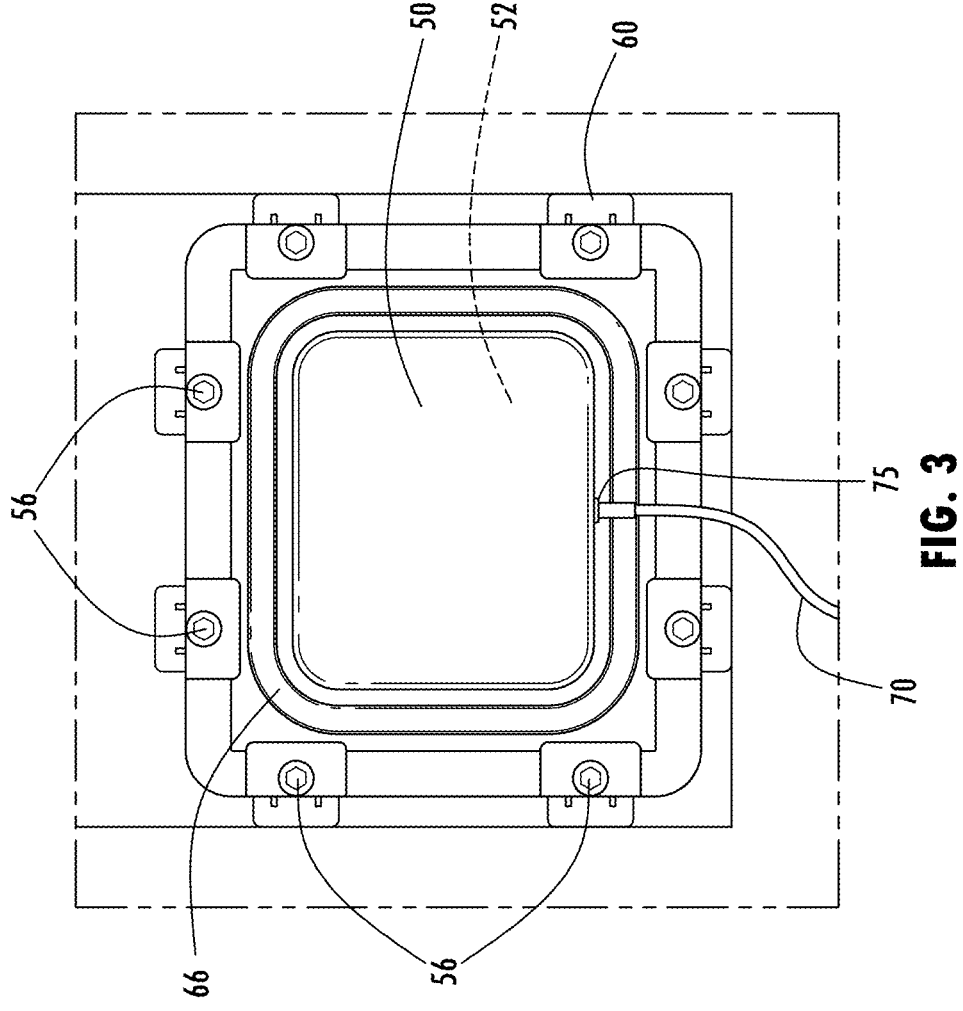
FIG. 3 is a bottom view of the electronic module attachment system, according to the first embodiment shown in FIG. 2.

The electronic module attachment system 24 is shown according to a first embodiment in FIGS. 2 and 3 having a sealed lower compartment 52 formed between a lower surface of the exterior trim component 22 and a sealed lower container housing 50. The sealed lower compartment 52 may be disassembled and opened by unfastening and removing the sealed lower container housing 50 from the lower surface of the exterior trim component 22 to access electrical circuitry contained therein. In this embodiment, the sealed lower container housing 50 is removeable by a user using fastener removal tools; e.g., a screwdriver or a wrench.

The electronic module attachment system 24 also includes a sealed upper container housing 26 that generally has a contoured fin 28 formed on the top side thereof. The sealed upper container housing 26 defines a sealed upper compartment 30 that forms a sealed housing sealed against an upper surface of the exterior spoiler component 22. Stored within the sealed upper compartment 30 are a plurality of electronic components that may include a first antenna module 32 and a second antenna module 34, according to one example. The first antenna module 32 may be utilized for FM communication, while the second antenna module 34 may be configured as a CV2-X shortrange communication antenna that may allow for communication with a cellular network infrastructure. For example, the second antenna module 34 may communicate with other motor vehicles in a vehicle-to-vehicle communication infrastructure or other infrastructures or networks, by using an existing cellular network infrastructure. It should be appreciated that first and second antenna modules 32 and 34 are shown mounted on top of a printed circuit board 36 which in turn is fixedly attached within the sealed upper compartment 30.

The scaled upper container housing 26 may be assembled onto the upper surface of the exterior spoiler trim component 22 and fastened thereto by tightening an upper fastener 42 which is configured as a threaded bolt that extends through an opening 74 in the exterior spoiler trim component 22 and threadingly engages a scalable collar 44 that also serves as a nut. the opening 74 extends between the upper and lower surfaces of the exterior spoiler trim component 22 and may be circular or cylindrical. The collar 44 thereby closes and seals the opening 74 when the upper fastener is tightened. By tightening the upper fastener 42, the scaled upper container housing 26 is forced downward to compress one or more upper seals in the form of gaskets between the sealed upper container housing 26 and the upper surface of the exterior spoiler trim component 22. In one example, an upper water seal 40 is disposed around the outer perimeter of opening 74 and an upper dust seal 38 is disposed around a perimeter of the sealed upper container housing 26. When the upper fastener 42 is fully tightened, seals 38 and 40 are compressed to form compressed seals around the sealed upper container housing 26.

The electronic module attachment system 24 further includes the sealed lower compartment 52 which is generally defined by a sealed lower container housing 50 that is connected to the lower surface of the exterior spoiler trim component 22. In the first embodiment, the sealed lower container housing 50 is fastened onto the lower surface of the exterior spoiler trim component 22 by a plurality of lower fasteners 56, which may include threaded screws, according to one example. The plurality of lower fasteners 56 tighten to fasten the sealed lower container housing 50 onto a supporting flange 60. As the lower fasteners 56 are rotated to tighten down, the sealed lower container housing 50 compresses a lower seal 54 in the form of a gasket that extends around a perimeter of the sealed lower compartment 52 which defines a watertight seal to keep water out of the sealed lower compartment 52. It should be appreciated that the sealed lower compartment 52 may contain electrical circuitry and/or components such as wires 72 which may be bundled within a cable 70. The cable 70 may extend through a watertight sealed grommet 75 that extends through an opening in the sealed lower container housing 50. The grommet 75 may extend through an opening on any side of the lower container housing 50 where the cable 70 is to be located. It should be appreciated that additional electronic components may be contained within the sealed lower compartment 52 which may include electrical connectors, electrical control circuitry, circuit boards and other electrical circuitry.

In order to access the electrical components within the sealed lower compartment 52 or the electrical modules in the upper sealed compartment 30, the plurality of lower fasteners 56 extending around a perimeter of the sealed lower container housing 50 may be removed according to this embodiment as shown in FIG. 3. As such, a total of eight lower fasteners 56 may be unfastened and removed to remove the sealed lower container housing 50 from the flange 60 to expose the sealed lower compartment 52. With the sealed lower container housing 50 removed, the lower portion of the upper fastener 42 is exposed and may be unfastened to remove the upper compartment housing 26 and gain access to the electrical modules contained in the sealed upper compartment 30.

Figure 4:
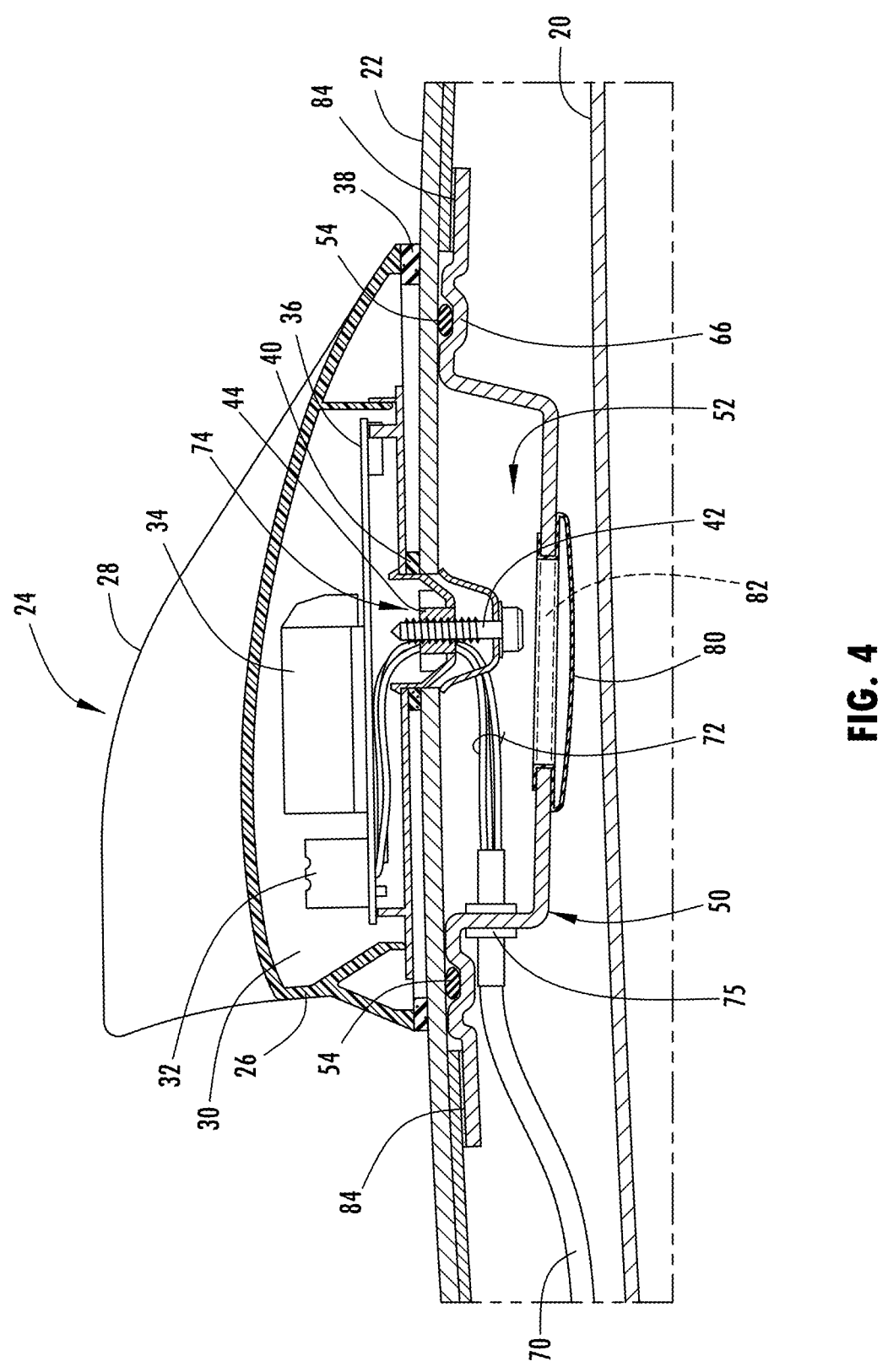
FIG. 4 is a cross-sectional view taken through line II-II of FIG. 1 for an electronic module attachment system, according to a second embodiment.

Referring to FIG. 4, an electrical module attachment system 24 is shown according to a second embodiment. In this embodiment, the sealed upper compartment 30 and sealed lower compartment 52 are substantially similar to that described above in connection with the first embodiment. In the second embodiment, the sealed lower container housing 50 is fixedly attached onto the lower surface of the exterior spoiler trim component 22. According to one example, the sealed lower container housing 50 may be adhered via an adhesive or welded onto the lower surface of the exterior spoiler trim component 22 such as via layer 84. As such, the sealed lower container housing 50 is generally considered non-removable by a user. In order to access the sealed lower compartment 52, an access hole 82 is formed in the lower compartment housing 50. The access hole 82 may be closed off with a grommet 80 which forms a sealed closure to the hole 82. With the grommet 80 removed, a user may access the sealed lower compartment 52, and hence the lower end of the upper fastener 42 may be accessed and the upper fastener 42 removed to access the upper compartment 30. Otherwise, the grommet 80 is left in place to cover the hole 82 to provide a watertight seal to keep the sealed lower compartment 52 in a dry state.

Accordingly, the electronic module attachment system 24 advantageously provides for a sealed compartment for electronic components that are attached to a trim component on the exterior of the motor vehicle 10. This advantageously allows for electrical components that are normally configured for use in dry environments to be used in a wet environment that is sealed off, thereby resulting in efficiencies.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. An electronic module system for a vehicle, the electronic module system comprising:
   an exterior trim component of the vehicle;
   an upper container housing configured to couple to an upper surface of the exterior trim component to define an upper compartment;
   at least one electronic module located in the upper compartment;
   an upper first seal for sealing the upper compartment relative to the upper surface of the exterior trim component;
   a lower container housing configured to couple to a lower surface of the exterior trim component to define a lower compartment;
   electrical circuitry located in the lower compartment; and
   a lower seal for sealing the lower container housing to the lower surface of the exterior trim component to seal the lower compartment.

2. The electronic module system of claim 1, further comprising a plurality of lower fasteners fastening the lower container housing to the lower surface of the exterior trim component.

3. The electronic module system of claim 2, wherein the plurality of lower fasteners comprise a plurality of screws or bolts.

4. The electronic module system of claim 1, wherein the lower container housing is adhered or welded to the lower surface of the exterior trim component.

5. The electronic module system of claim 1, further comprising an upper fastener for fastening the upper container housing to the upper surface of the exterior trim component.

6. The electronic module system of claim 5, wherein the upper fastener extends through an opening in the exterior trim component.

7. The electronic module system of claim 6, wherein the upper fastener engages a collar configured to be disposed in the opening in the exterior trim component.

8. The electronic module system of claim 7, wherein the upper compartment is accessible via the lower compartment.

9. The electronic module system of claim 1, wherein the at least one electronic module comprises of at least one antenna.

10. The electronic module system of claim 1, wherein the electrical circuitry comprises an electrical cable.

11. The electronic module system of claim 1, wherein the exterior trim component comprises a spoiler trim component.

12. A vehicle comprising:
   an exterior trim component having an upper surface, a lower surface and an opening extending between the upper and lower surfaces; and
   an electronic module system comprising:
      an upper container housing coupled to the upper surface of the exterior trim component to define an upper compartment;
      at least one electronic module located in the upper compartment;
      an upper seal for sealing the upper container housing relative to the upper surface of the exterior trim component;
      a sealable collar disposed in the opening;
      an upper fastener operatively engaging the collar to fasten the upper container housing to the upper surface of the exterior trim component;
      a lower container housing coupled to the lower surface of the exterior trim component to define a lower compartment;
      electrical circuitry located in the lower compartment; and
      a lower seal engaging the lower container housing to the lower surface of the exterior trim component to seal the lower compartment.

13. The vehicle of claim 12, further comprising a plurality of lower fasteners fastening the lower container housing to the lower surface of the exterior trim component.

14. The vehicle of claim 13, wherein the plurality of lower fasteners comprise a plurality of screws or bolts.

15. The vehicle of claim 12, wherein the lower container housing is adhered or welded to the lower surface of the exterior trim component.

16. The vehicle of claim 12, wherein the upper fastener extends through the collar in the opening in the exterior trim component.

17. The vehicle of claim 16, wherein the upper compartment is accessible via the lower compartment.

18. The vehicle of claim 12, wherein the at least one electronic module comprises of at least one antenna.

19. The vehicle of claim 12, wherein the electrical circuitry comprises an electrical cable.

20. The vehicle of claim 12, wherein the exterior trim component comprises a spoiler trim component.

* * * * *